No. 686,377. Patented Nov. 12, 1901.
C. L. WILKINS.
RECIPROCATING WATER MOTOR.
(Application filed June 2, 1899.)
(No Model.) 3 Sheets—Sheet 2.
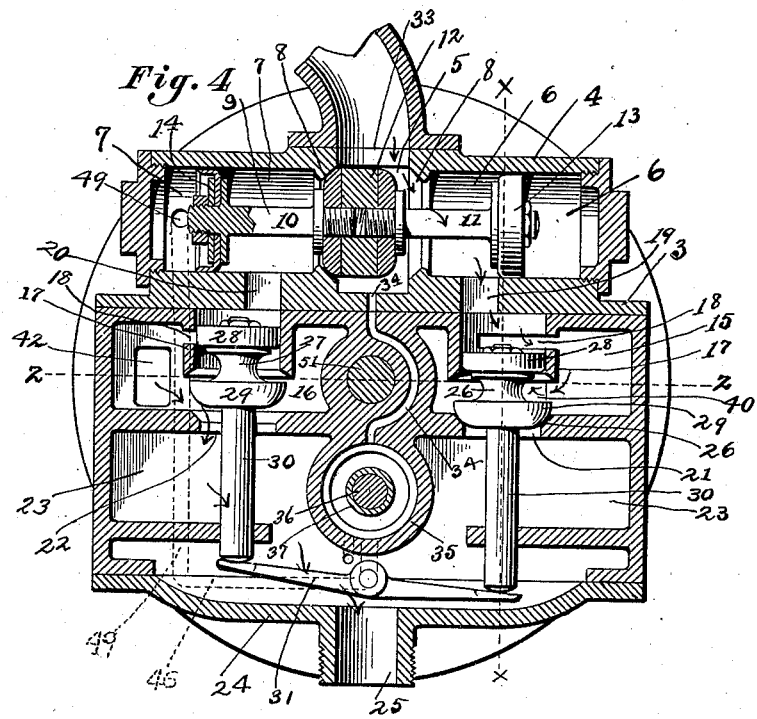
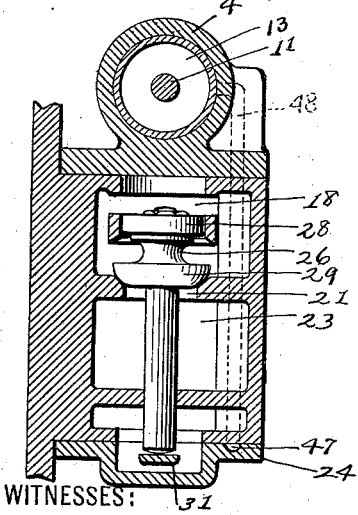
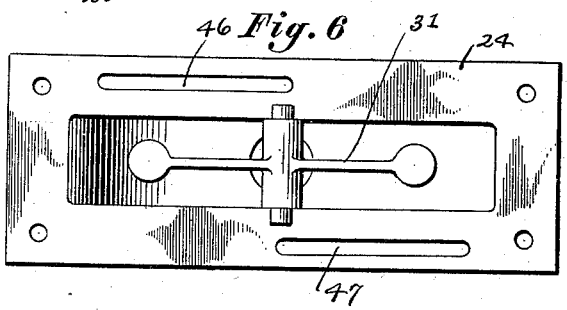
WITNESSES: INVENTOR
Charles L. Wilkins
BY
C. C. Shepherd
ATTORNEY No. 686,377. Patented Nov. 12, 1901.
C. L. WILKINS.
RECIPROCATING WATER MOTOR.
(Application filed June 2, 1899.)
(No Model.) 3 Sheets—Sheet 3.
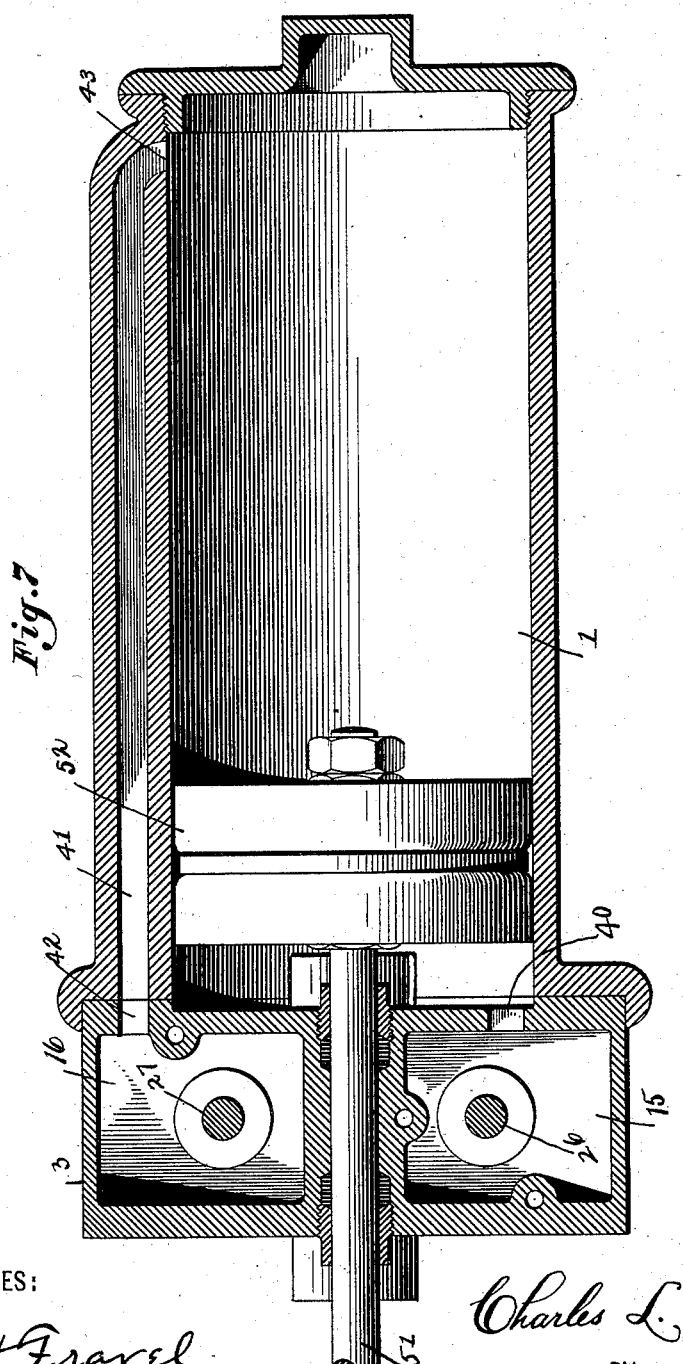
WITNESSES:
INVENTOR
Charles L. Wilkins
BY
C. C. Shepherd
ATTORNEY

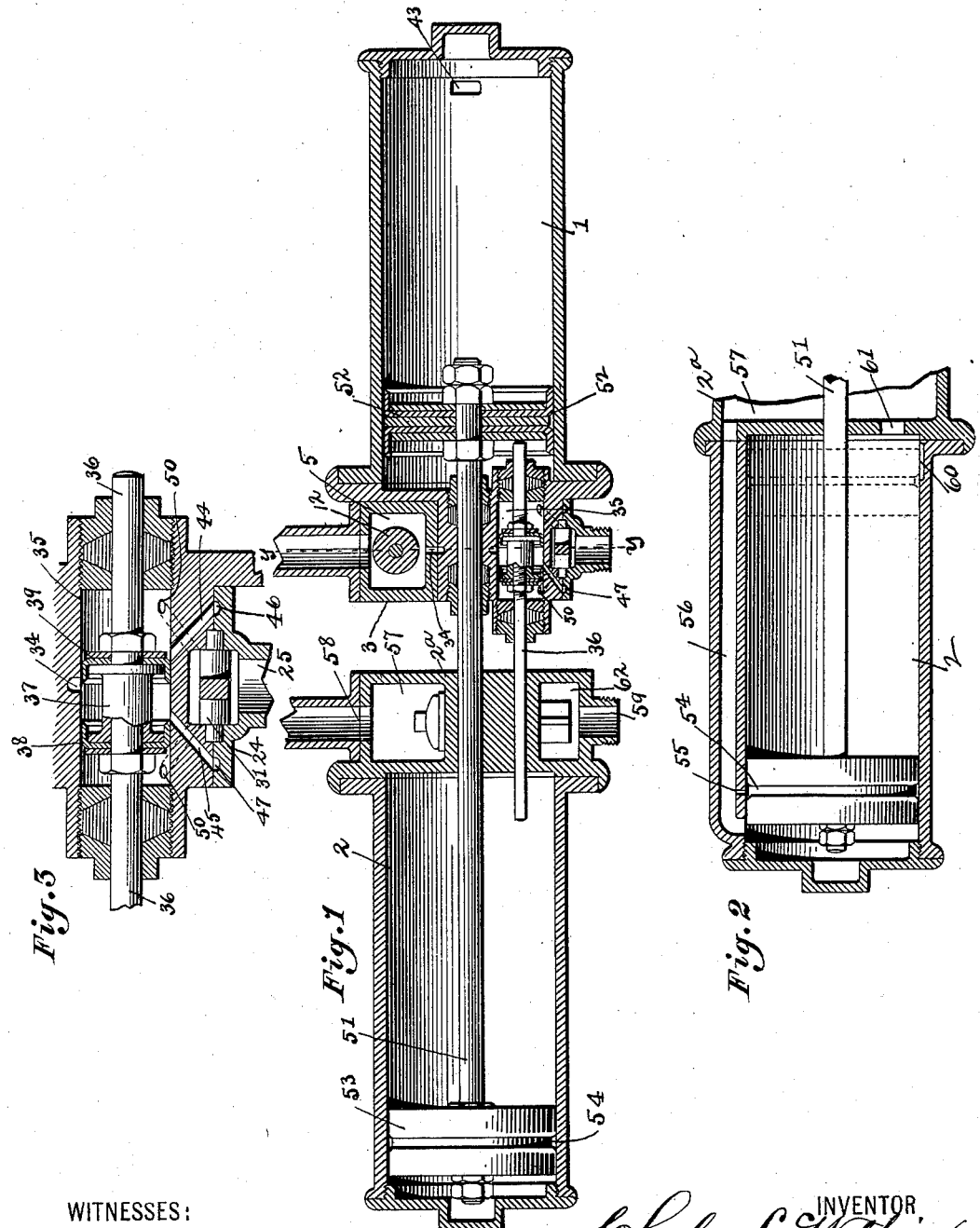

UNITED STATES PATENT OFFICE.

CHARLES L. WILKINS, OF COLUMBUS, OHIO.

RECIPROCATING WATER-MOTOR.

SPECIFICATION forming part of Letters Patent No. 686,377, dated November 12, 1901.

Application filed June 2, 1899. Serial No. 719,056. (No model.)

*To all whom it may concern:*

Be it known that I, CHARLES L. WILKINS, a citizen of the United States, residing at Columbus, in the county of Franklin and State of Ohio, have invented a certain new and useful Improvement in Reciprocating Water-Motors, of which the following is a specification.

My invention relates to the improvement of reciprocating water-motors, and has particular relation to that class of water-motors in which the pressure of water in city pipes is employed to operate a pumping-engine for the purpose of drawing rain-water from a cistern into house-pipes or for other purposes.

The objects of my invention are to provide a motor of this class of superior construction and arrangement of parts and to produce certain improvements therein which will be pointed out hereinafter. These objects I accomplish in the manner illustrated in the accompanying drawings, in which—

Figure 1 is a central vertical longitudinal section of my improved motor. Fig. 2 is a sectional view of the suction-cylinder, taken at right angles with that shown in Fig. 1. Fig. 3 is a sectional view of the lower portion of the power-cylinder head, the same being for the sake of clearness enlarged from that shown in Fig. 1. Fig. 4 is an enlarged sectional view on line $y\ y$ of Fig. 1. Fig. 5 is a sectional view on line $x\ x$ of Fig. 4. Fig. 6 is a plan view of the bottom plate of the power-cylinder head; and Fig. 7 is an enlarged longitudinal section of said power-cylinder, taken on the dotted line indicated at $z\ z$ in Fig. 4.

Similar numerals refer to similar parts throughout the several views.

In carrying out my invention I employ two separated cylinders 1 and 2, the latter being arranged in horizontal alinement with each other and suitably supported. These cylinders for the sake of clearness I will distinguish by reference to the same as "power" and "suction" cylinders, respectively. As indicated at 3, I provide the cylinder 1 with a head portion, in which are comprised the various valves, ports, chambers, and inlet and outlet openings employed in producing the desired operation of the piston, hereinafter described. In constructing this head I provide the upper portion thereof with a transverse valve-cylinder 4, which is intersected centrally by a valve-compartment 5, which serves to partially separate said valve-cylinder into two end sections or portions 6 and 7. On opposite sides of the compartment 5 the inner side of the cylinder 4 is formed with inwardly-projecting circular valve-seats 8. Within the cylinder 4 I employ a valve-rod or shaft 9, which is preferably formed of two sections 10 and 11, the inner ends of these sections being coupled within the valve-compartment 5 by being screwed into the threaded opening of the central portion of a valve 12. The outer end portion of each of the valve-sections 10 and 11 carries thereon a head, these heads being indicated at 13 and 14 and being of such form and size as to fit and slide within the cylinder portions 6 and 7. Below the valve-cylinder 4 I provide the head 3, on opposite sides of the center thereof, with water-chambers 15 and 16, the latter being provided in their upper sides with downwardly-projecting tubular inlets or valve-casings 17, these tubular inlets being provided with transverse slotted openings 18 and communicating in their upper portion, through the medium of ports 19 and 20, with the valve-cylinder portions 6 and 7. The floor or lower side of each of the chambers 15 and 16 is provided with an opening, the latter being indicated, respectively, at 21 and 22 and being shaped in their upper portions to form valve-seats, as shown. These openings or ports 21 and 22 communicate with a lower transverse water-chamber 23, the bottom plate 24 of which is provided with a central exhaust-outlet 25.

26 and 27 represent vertically-movable valves, the head portion of each of which consists of an upper and lower valve enlargement 28 and 29, the valve-head portions 28 being adapted to fit and slide within the tubular inlets 17, while the lower valve-head portions 29 are adapted to close the openings 21 and 22. As indicated at 30, each of the valves 26 and 27 is provided with a downwardly-extending stem portion, which passes loosely through guide-arms in the chamber 23. The lower ends of the valve-stems 30 are adapted to contact, respectively, with the upper sides of the end portions of a centrally-fulcrumed lever 31, which is supported in the bottom plate 24.

Leading into the upper side of the valve-compartment 5 is an inlet-pipe 33, and leading downwardly from the lower portion of said valve-compartment beneath the valve 12 is a port 34, the lower end of the latter communicating with the upper side and center of the length of a valve-cylinder 35, which is arranged in the upper and central portion of the lower chamber 23 and which extends at right angles with the valve-cylinder 4. Extending longitudinally through the cylinder 35 and having a sliding bearing in the ends of the latter is a valve-rod 36, this rod carrying within said cylinder a valve 37, having separated heads 38 and 39, which fit and slide within said cylinder 35. One end of the valve-rod 36 is adapted, as shown in Fig. 1 of the drawings, to project within the inner end of the cylinder 1, which is connected with said head 3, while the other end has a sliding support in the head 2ª of the cylinder 2, within which said rod projects. Leading from the chamber 15 into the inner end of the cylinder 1 is a port 40, (see Figs. 4 and 7,) while leading into a wall-passage 41 of said cylinder 1 from the chamber 16 is a port 42, said wall-passage communicating at 43 with the outer end portion of the cylinder 1.

Leading downward from the lower side of the cylinder 35 are separated ports 44 and 45, these ports connecting, respectively, with longitudinal grooves in the upper side of the head base-plate 24, said grooves being indicated at 46 and 47. One end of the groove 47, as indicated more clearly in Fig. 5 of the drawings, communicates with the lower end of an upwardly-extending passage or port 48, (shown in dotted lines,) and the upper end of which enters the end portion 6 of the valve-cylinder 4. As shown in dotted lines in Fig. 4 of the drawings, one end of the groove 46 communicates with the lower end of a port or passage 49, the upper end of which communicates with the end portion 7 of the cylinder 4. As indicated at 50 in Figs. 1 and 3 of the drawings, I provide exhaust-ports near each end of the valve-cylinder 35, said ports communicating with the exhaust-outlet 25.

51 represents a sliding piston-rod, which, as shown more clearly in Fig. 1 of the drawings, passes through central bearings in the cylinder-heads 2ª and 3, said piston-rod carrying on one end within the cylinder 1 a piston-head 52 and on its remaining end within the cylinder 2 a piston-head 53, these piston-heads fitting and sliding within said cylinders. In constructing the piston-head 53 I form the same, for the purpose hereinafter set forth, with a shallow peripheral recess 54, which when said piston-head is near the outer end of the cylinder 2 communicates, through the medium of a small port 55, with a longitudinal wall-passage 56 of said cylinder 2, the outer end of said wall-passage leading into the outer end of the cylinder and the inner end thereof communicating with a chamber 57 in the head 2ª, said chamber being provided with an outlet 58. As shown more clearly in Fig. 2 of the drawings, I provide the inner surface of the cylinder 2, adjoining its inner end, with a shallow longitudinal recess 60. Through a port 61 communication is established between the inner end of the cylinder 2 and a head-chamber 62, the latter having an outlet 59.

In order to illustrate the operation of my improved motor, we will assume that the valve and other movable parts of my device are in the positions indicated in Fig. 4 of the drawings. This being true, it will be seen that the valve 12 is against that seat 8 which results in closing communication between the valve-compartment 5 and the cylinder portion 7. Water from a city supply or other source now being directed into the inlet 33 is free to pass in the direction of the full-line arrows into the compartment 5 and cylinder portion 6, thence through the port 19, where it depresses the valve 26. This depression of said valve results in the head portion 28 moving below the tubular inlet-opening 18 and in the valve portion 29 closing the opening 21. The water which now passes outward through the slotted opening 18 into the chamber 15 and thence through the opening or port 40 into the inner end of the cylinder 1 serves to force the piston-head 52 toward the outer end of said cylinder 1, thereby drawing the piston-head 53 toward the inner end of the cylinder 2. It will be observed that the port 34, which leads to the valve-cylinder 35 and between the heads 38 and 39 thereof, is at all times in communication with the water-inlet 33 through the compartment 5 and that the water thus carried to said cylinder 35 is adapted to pass outward therefrom through that port 44 or 45 which is not cut out of communication with the space between the piston-heads by the positions of the latter. In the movement heretofore described of the piston-head 53 toward the inner end of its cylinder 2 it will be seen that said piston-head 53 will by contact with the end of the valve-rod 36 force the valve-head 38 past the port 45 and the valve-head 39 past the port 44, thereby opening communication between said ports 44 and 34 and directing the water through the former and the groove 46, thence upward through the passage 49 into the end of the cylinder portion 7. The above-described movement of the valve-head 38 past the port 45 results in establishing a communication between the cylinder portion 6 and one of the exhaust-ports 50 through the medium of said ports 45 and 47, thus releasing pressure on one side of the valve 12. The movement of the piston-head 52 toward the outer end of its cylinder 1, above described, results in forcing the water which may be in front of said piston-head through the port 43 and passage 41 into the chamber 16, from which point, following the direction of the full-line arrows, the water may escape through the exhaust-outlet 25. It is obvious that the water which has passed through the port 49 into the outer end of the cylinder portion 7 will now serve to drive the valve 12 to the right, closing the entrance 8 to the cylinder portion 6 and turning the water which enters the inlet 33 through the cylinder portion 7 down through the port 20, where the pressure of water presses the valve 27 downward until the slotted opening 18 is unclosed and the opening 22 is closed. The water thus passing through the slotted opening 18 into the chamber 16 travels through the port 42, passage 41, and port 43 into the outer end of the cylinder 1 and serves to drive the piston-head 52 back to the position indicated in Fig. 1 of the drawings. As the piston-head 52 approaches the inner end of the cylinder 1 contact with one end of the valve-rod 36 operates, as will readily be seen, to so move the valve 37 as to cause a communication of the port 45 and groove 47 and cut off connection of the port 44 with the space between the heads of said valve 37. The water thus passing through the groove 47 is directed upward through the port or passage 48, thence into the outer end of the cylinder portion 6, resulting in again driving the valve 12 to the position indicated in Fig. 4. From this operation it will be seen that the movement of the piston-heads within the cylinders 1 and 2 serves to communicate a sliding motion to the valve 37, which results in successively changing the flow of water through the ports or passages 49 and 48 and in successively directing water from the main inlet 33 through the ports 19 and 20, which lead to opposite ends of said cylinder 1. In order to prevent any possibility of the resistance of the water-pressure against which the piston 53 is traveling in its outward movement interfering with the inward traveling movement of the piston-head 52 and prevent thereby an operative movement of the valve 37, I have provided said piston 53 with the peripheral recess 54. When said piston-head 53 has reached the point where its recess 54 communicates with the passage 56 through the medium of the port 55, it will be seen that a sufficient quantity of the water may escape through the port 55 into the peripheral recess 54 to cause a reduction in the pressure of the water against which said piston is traveling, thus insuring the movement of said piston-head to its proper limit and insuring the proper contact of the piston-head 52 with the valve-operating rod 36. In order to insure a full movement of the piston-head 53 toward the inner end of its cylinder, I have provided said cylinder adjoining its inner end with the inner wall recess 60, which serves to effect a communication between the piston-head recess and the water in front of said piston-head, thereby relieving the head from the pressure of water against which the same is traveling.

With reference to the operation described in the preceding paragraph it may be mentioned that the water which is in front of the piston may pass not only into the recess 54 or wall-recess 60, but also into the space behind the piston when the latter has sufficiently completed its stroke, thus providing additional relief of pressure in front of the piston from that gained through the entrance of water to said recesses.

From the construction and operation herein described it will be seen that a reliable and effective mechanism is provided for imparting a reciprocating movement to the piston and that the pumping-cylinder 2 and the piston-head contained therein are so constructed as to render the operation of the controlling-valves 37 and 12 positive and uniform.

Having now fully described my invention, what I claim, and desire to secure by Letters Patent, is—

1. In a water-motor, the combination of power and suction cylinders, a piston-rod working in said cylinders and carrying heads therein, a valve-cylinder 4 having a valve-compartment 5 in constant communication with the water-inlet, ports 19 and 20 leading therefrom to opposite ends of said cylinder 1, an inlet for said cylinder 4 and a reciprocating valve therein the position of which controls the direction of the flow of incoming water, and valves 26 and 27 controlling passageways leading from the cylinder 4 to opposite ends of the cylinder 1, of a cylinder 35, a rod working therethrough and having its ends extending directly into said cylinders 1 and 2, a valve 37 on said rod, ports leading from said cylinder 35 to opposite ends of the cylinder 4, a port 34 connecting the cylinder 4 with the cylinder 35, said valve 37 being adapted by contact of its supporting-rod with the heads of the piston to alternately open and close communication between the ports 44 and 45 and the port 34, substantially as specified.

2. In a water-motor, the combination of a cylinder and a piston working therein, of a valve-cylinder 4 having a valve-chamber 5, a water-inlet 33 therefor, a reciprocating valve 12 in said cylinder, upper water-chambers 15 and 16 communication between which and the chamber 5 is controlled by said valve 12 and a lower water-chamber 23 communicating through openings 21 and 22 with the chambers 15 and 16, ports leading from said chambers 15 and 16 to opposite ends of said cylinder 1, ports connecting the valve-cylinder 4 with said chambers 15 and 16, valves 26 and 27 adapted by vertical movement to alternately open and close communication between said chambers 15 and 16 and the chamber 23, an exhaust-port 25 and a fulcrumed lever in said chamber 23 with which the stems of said valves 27 and 26 contact, water passages or ports leading into opposite ends of the cylinder 4 and means whereby the reciprocating movement of the piston within its cylinder 1 controls the direction of the flow of water in said passages whereby water entering the inlet 33 is directed either through the passage 19 or 20, substantially as specified.

3. In a motor, the combination of a cylinder having a wall-passage 56 communicating with the outer end of said cylinder, a piston rod and head in said cylinder, a peripheral recess in said piston-head a port in the wall of said cylinder which is adapted when said piston is opposite the same to provide a connection between the cylinder-space on the outer side of said piston-head and said piston-head recess and an inner wall-recess at the inner end of the cylinder with which said piston-head recess is adapted to communicate, substantially as specified.

CHARLES L. WILKINS.

In presence of—
C. C. SHEPHERD,
C. E. SHOCKEY.